United States Patent Office 2,799,718
Patented July 16, 1957

2,799,718

ODORLESS SOLVENT AND METHOD OF MAKING SAME

Warner E. Scovill, Lakewood, and John G. Partch, South Euclid, Ohio, assignors to The Standard Oil Company, Cleveland, Ohio, a corporation of Ohio No Drawing. Application October 18, 1954,
Serial No. 463,050

2 Claims. (Cl. 260—683.4)

This invention relates to a method of improving the odor of a hydrocarbon stock in order to render it suitable for use as a solvent, such as in the manufacture of paints and like materials. The invention also relates to the product produced thereby.

In the industries using hydrocarbon solvents, such as the paint industry, the odor of any solvent is important. Solvents which by themselves appear relatively free of odor often are unsuitable for use in paint, probably because all of the solvent evaporates in a short time, often in a closed room, or under conditions in which any odor is accentuated. Not only is it desirable that the solvent be odorless initially, but it should not develop odor upon aging, upon being mixed with the paint ingredients, or upon exposure to air after the paint is applied in a thin film.

We have discovered that by treating a particular hydrocarbon stock, i. e. a heavy fraction of the stock produced by the catalytic alkylation of isobutane with butylene in the manner to be described, we can eliminate the odor and latent odor-forming tendency of this particular hydrocarbon stock, and thereby produce a satisfactory odorless solvent for incorporation in paints and like materials.

Our invention is concerned with a particular stock; and while it is well known in the petroleum industry, we believe it desirable to described briefly the source of it and manner of making it. Alkylate is made by reacting isobutane with butylenes in the presence of a catalyst, e. g. hydrofluoric or sulfuric acid. The principal use of the product produced by the catalytic alkylation of the $C_4$ hydrocarbons is as a blending stock in the preparation of high octane aviation gasolines. However, there is a minor amount of a high-boiling fraction, hereinafter referred to as heavy alkylate, which occurs in the total product of the alkylation process. Heavy alkylate is unsuitable for use in aviation gasoline because of its low volatility, i. e. high boiling range. Accordingly, it has been the practice in the art to separate the heavy alkylate from the total alkylate by distillation, and to employ the heavy alkylate as a blending stock in the manufacture of automotive or marine gasolines in which it is permissible to include stocks of low volatility. Only the lower boiling fraction or the light alkylate is included in the aviation gasoline.

The heavy alkylate produced by the catalytic alkylation process is unsuitable to the paint industry as a solvent because of the desire by this industry for an odorless solvent. At the time of manufacture the heavy alkylate, while it possesses a slight sour odor, does not seem to have an odor that would preclude its use as a solvent. However, it has been found that the heavy alkylate will develop a very disagreeable odor upon aging which makes it undesirable as a paint solvent.

Because of the greater economic benefits which may be realized from the sale of heavy alkylate as a solvent as compared to its sale as one of the components of automotive or marine gasolines, a method of producing a satisfactory odorless solvent from this stock has long been sought in the art. There have been many unsuccessful attempts in the prior art to eliminate this latent tendency of the heavy alkylate to develop disagreeable odors. For example, U. S. Patent No. 2,468,986 discloses that such processes as blowing the distillate with air, blowing it with nitrogen, blowing it with carbon dioxide, extracting the distillate with alkali, refluxing the distillate in the presence of solid caustic and percolating the distillate through fuller's earth have all been unsuccessful in removing the latent tendency of heavy alkylate to develop disagreeable odors.

It is therefore the principal object of our invention to provide a method of producing an odorless solvent from the heavy alkylate.

Our invention consists, in brief, of the discovery that the latent tendency to produce odors, which heretofore has been a characteristic of the heavy alkylate, may be eliminated by the treatment of the alkylate with a fuller's earth having a critical volatiles content below about 7.5% by weight (measured by heating the clay at 1700° F. and determining the loss in weight).

This discovery is surprising in that the prior art discloses unsuccessful attempts to eliminate the tendency to form odor of this stock by treatment with fuller's earth, but this is readily explained by the fact that treatment with ordinary fuller's earth having the ordinary volatiles content does not remove the odor.

The heavy alkylate used in connection with this invention is manufactured by any of the conventional catalytic alkylation processes. One of the processes commonly employed in the industry is one in which a mixture of isobutane and butylenes is fed to a reactor where it is contacted with sulfuric acid which serves as a catalyst for the reaction. The reactor is maintained at a temperature of about 30° to 70° F. and a pressure of about 5 to 15 p. s. i. g. during the reaction. The feed to the reactor usually has a volumetric ratio of isobutane to butylenes of about 1.3 to 1, while the concentration of the sulfuric acid in the reactor may be varied from about 98% to about 85%. The reactor effluent which contains the total alkylate production is fractionated by conventional techniques, after the usual acid separation and neutralization steps, to remove unreacted feed. The total alkylate is then split into two fractions, a light alkylate boiling from about 100° to about 320° F., and a heavy alkylate boiling from about 320° to about 620° F. The heavy alkylate may then be further fractionated to obtain a stock boiling from about 350° F. to 410° F. which is especially suited for paint manufacture. The present invention is concerned with the treatment of the heavy alkylate and preferably that fraction boiling from about 350° F. to 410° F. The conditions of alkylation are not critical, and any heavy alkylate can be treated by our invention.

The clay used in this invention is a fuller's earth. A maximum volatiles (mostly water) content of 7.5% by weight, measured by heating to 1700° F., is essenital in the fuller's earth we use. A fuller's earth containing amounts of volatiles exceeding this specification will be ineffective if employed in the method of this invention. Clay that is exposed to the ordinary atmospheric conditions will have a higher volatiles content and is not suitable. The clay may be dehydrated just before use, or if dehydrated by the manufacturer, it must be stored and shipped in special moisture-proof bags. Any clay of the fuller's earth type, as long as it meets the maximum volatiles content, may be used. Water is readily absorbed and held by clays. It is believed that the water and other volatile matter absorbed on the surface of the clay interferes with its ability to remove the odorous or odor-forming bodies. When the amount of volatiles is below 7.5%, the clay satisfactory removes the odor. Of course, the clay may have any amount of volatiles less than 7.5%, or no volatiles content and, accordingly, the lower the volatiles content, the longer the life of the fuller's earth as an effective treating agent.

The contacting of the fuller's earth with the heavy alkylate or a fraction thereof may be accomplished in either a batch or a continuous operation. However, as a practical matter, continuous treating of the alkylate is preferred inasmuch as less equipment is required and the stock may be treated as it is produced and sent directly to storage.

The preferred method of treating the heavy alkylate continuously is to percolate the alkylate continuously through a treating vessel containing a fuller's earth (15–30 mesh), of the type specified, at a temperature from about 50° to about 90° F. No upper temperature limit been found inoperative, but a temperature below the boiling point of the solvent is preferred to avoid the use of pressure. The bed depth of clay in the tower is not critical. It will, of course, be obvious to those skilled in the art that the greater the clay bed depth the less frequent will replacement of the clay in the bed be necessary. It has been found that percolation rates up to about 60 bbl./hr./ton will produce a satisfactory product. Lower percolation rates will, of course, be satisfactory, and 20 bbl./hr./ton to 50 bbl./hr./ton represents a good commercial range for the rates.

The life of the clay used in this process will vary, depending on the quality of the alkylate to be treated, but generally will fall in the range from about 300 bbl./ton to 750 bbl./ton. Loss of activity of the clay will be evidenced by the appearance of a deep purple color on the clay.

In carrying out the method of this invention in a continuous manner as described hereinabove, it is advantageous to employ two or more treating vessels alternately. In this manner the clay charge in one of of the vessels may be replaced without any interruption in the production of the odorless solvent. It is also possible to mix the solvent with finely divided clay of the contact type (200 mesh) and then filter the solvent from the clay.

*Example 1*

As an example of the preferred embodiment of this invention, 15 bbl. of a heavy alkylate fraction boiling in the range from about 350° to 410° F. was percolated through a tower containing 50 lbs. of fuller's earth having a volatiles content of 7% by weight (measured by heating to 1700° F.). The alkylate was maintained at a temperature of 80° F., and it was percolated at the rate of 40 bbl./hr./ton. The treated alkylate was then stored for a period of 120 days at 110° F. in a metal container. At the termination of this period, the treated alkylate was odorless, which is indicative of its suitability for use as a paint solvent. It was found entirely acceptable by paint manufacturers.

*Example II*

In another experiment the conditions of Example I above were duplicated, except for the fact that the fuller's earth was an ordinary grade not protected from the atomsphere and had a volatiles content of 9% by weight (measured by heating to 1700° F.). The product of this experiment had an unsatisfactory odor, and it was apparent that the process was ineffective with a fuller's earth of this composition.

While this invention has been described in relation to the paint industry, it will be obvious to those skilled in the art that the method of this invention is applicable to the production of products for any industry desiring odorless solvents of the hydrocarbon type.

The reactions by which odorous compounds are formed in the heavy alkylate are not completely understood, but it was thought that the clay was removing sulfur-containing compounds which are by-products or intermediates from the sulfuric acid alkylation. However, an infra red analysis of the products of Examples I and II has shown that the satisfactory solvent of Example I contains less olefins than the unsatisfactory product of Example II. It could well be that the odorous compounds are formed as a result of the gradual oxidation of the olefinic compounds. Irrespective of the exact action that is taking place, we have confirmed that our process eliminates the latent tendency of the heavy alkylate to develop disagreeable odors and that volatiles in the clay, above a certain amount, will inhibit the adsorption of the odorous compounds by the fuller's earth. The exact theory applicable to the method of this invention is not important, and the invention is not deemed to be limited, except as it is limited by the appended claims.

We claim:

1. A method of producing an odorless solvent which comprises the step of contacting heavy alkylate, the fraction boiling in the range from about 320° F. to about 620° F. and produced by the catalytic alkylation of isobutane with butylenes, with a fuller's earth containing less than about 7.5% volatile matter as measured by ascertaining the loss in weight upon heating to 1700° F.

2. A method of producing an odorless solvent which comprises the step of contacting heavy alkylate, the fraction boiling in the range from about 350° F. to about 410° F. and produced by the catalytic alkylation of isobutane with butylenes, with a fuller's earth containing about 7% volatile matter as measured by ascertaining the loss in weight upon heating to 1700° F.

References Cited in the file of this patent

UNITED STATES PATENTS

| | | |
|---|---|---|
| 2,363,876 | La Lande et al. | Nov. 28, 1944 |
| 2,442,011 | Legatski | May 25, 1948 |
| 2,468,986 | Legatski et al | May 3, 1949 |
| 2,553,355 | Brandon | May 15, 1951 |